United States Patent Office 2,972,620
Patented Feb. 21, 1961

2,972,620
2-HALOIMINO-1,3-DIOXOLANES AND METHOD OF PRODUCTION

Howard Ensign Simmons, Jr., Wilmington, Del., assignor to E. I. du Pont de Nemours and Company, Wilmington, Del., a corporation of Delaware No Drawing. Filed June 29, 1959, Ser. No. 823,365

7 Claims. (Cl. 260—340.9)

This invention relates to novel substituted dioxolanes. More particuarly the invention concerns the 2-haloimino-1,3-dioxolanes, especially those 2-haloimino-1,3-dioxolanes in which the substituents (if any) on the 4- and 5-positions are halogen and to a process for preparing such compounds.

The novel process produces 2-haloimino-1,3-dioxolane by the reaction of a halogen, i.e., chlorine or bromine, with ethylene glycol and an alkali metal cyanide under alkaline conditions, i.e., at pH above 7. 2-haloimino-1,3-dioxolane may be further halogenated by reaction with additional halogen, such as chlorine or bromine in the presence of ultraviolet light to yield the other members of this new class of compounds.

The products of this invention may be illustrated by the formula:

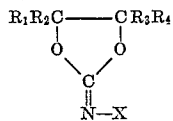

wherein $R_1$, $R_2$, $R_3$, and $R_4$ are each selected from the group consisting of hydrogen, chlorine, or bromine, i.e., they may be the same or different and X is chlorine or bromine.

The reaction of the present invention may be carried out at room temperature or higher, i.e., up to 50° C., but temperatures below room temperature are preferred, particularly temperatures in the range of −20 to +10° C. The alkaline medium for the reaction is preferably an aqueous solution of an alkali metal hydroxide, particularly sodium hydroxide or potassium hydroxide. All alkali metal cyanides are operable in the process of this invention, and lithium, sodium, and potassium cyanides are preferred.

The ingredients react in the following molar proportions; ethylene glycol: alkali metal cyanide: halogen: alkali metal hydroxide; 1:1:2:2. This ratio, with preferably an excess of the alkali metal hydroxide is quite suitable. However, the particular proportions selected are by no means critical and up to a four-fold quantity variation in either direction for one or more of the reactants would still be operable.

In the examples which follow, parts are by weight unless otherwise indicated. Example I represents a preferred embodiments of the invention.

Example I

A mixture of 124 parts of ethylene glycol, 130 parts of potassium cyanide, 160 parts of sodium hydroxide, and 500 parts of water is stirred in a glass reactor and cooled to −5° C. Chlorine gas is then passed into the solution while maintaining the temperature in the range of −5 to +5° C. When the solution becomes neutral (i.e., pH 7), the passage of chlorine is stopped. The mixture is extracted several times with ether. The ether extract is dried over magnesium sulfate and concentrated by evaporation. The concentrate is cooled and 95 parts of 2-chloroimino-1,3-dioxolane crystallizes out, M.P. 37–38° C. A sample recrystallized from pentane/ether melts at 35–38° C. and shows a strong absorption at 6.05 microns (C=N) in the infrared spectrum.

*Analysis.*—Calcd. for $C_3H_4ClNO_2$: C, 29.65; H, 3.31; N, 11.53. Found: C, 29.55; H, 3.31; N, 11.73.

Example II

Chlorine gas is passed into a solution of 61 parts of 2-chloro-imino-1,3-dioxolane in 158 parts of carbon tetrachloride, under reflux and in the presence of ultraviolet light. The ultraviolet light treatment was continued for about 3 hours and the resulting white product allowed to stand overnight. After concentration to remove solvent, the material was distilled to yield a product which consisted primarily of 2-chloroimino-4,5-dichloro-1,3-dioxolane containing a minor amount of 4-chloro-2-chloroimino-1,3-dioxolane.

*Analysis.*—Calcd. for $C_3H_2Cl_3NO_2$: C, 18.93; H, 1.52; Cl, 55.79. Calcd. for 90% $C_3H_2Cl_3NO_2$/10% $C_3H_3Cl_2NO_2$: C, 19.35; H, 1.57; Cl, 54.76. Found: C, 19.45; H, 2.29; Cl, 54.25.

Exhaustive chlorination of 2-chloroimino-1,3-dioxolane or 2-chloroimino-4,5-dichloro-1,3-dioxolane with chlorine in the presence of ultraviolet light, as in Example II, yields 2-chloroimino-4,4,5-trichloro-1,3-dioxolane and 2-chloroimino-4,4,5,5-tetrachloro-1,3-dioxolane. The corresponding bromo derivatives are obtained by using bromine in place of chlorine. For example, when bromine is used in place of chlorine in Example I, the product is 2-bromoimino-1,3-dioxolane. Successive bromination of this compound in the manner of Example II yields 4-bromo-2-bromoimino-1,3-dioxolane, 2-bromoimino-4,5-dibromo-1,3-dioxolane, 2-bromoimino-4,4,5-tribromo-1,3-dioxolane, and 2-bromoimino-4,4,5,5-tetrabromo-1,3-dioxolane.

The compounds of this invention are useful as mild bleaching agents for stained fabrics. The halogen of the 2-haloimino group is responsible for the bleaching action. This halogen is not highly labile, and the bleaching action is correspondingly gentle. For example, cotton fabrics stained with tea, coffee, ink, and grape juice are treated by soaking in an aqueous infusion of 2-chloroimino-1,3-dioxolane. All the stains are partly bleached by this treatment.

What is claimed is:
1. 2-chloroimino-1,3-dioxolane.
2. 2-bromoimino-1,3-dioxolane.
3. A compound of the formula

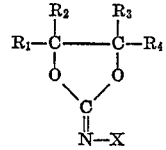

wherein $R_1$, $R_2$, $R_3$, and $R_4$ are each selected from the group consisting of hydrogen, chlorine and bromine and X is selected from the group consisting of chlorine and bromine.

4. A method for making a 2-haloimino-1,3-dioxolane which comprises reacting at a temperature of up to about 50° C., a halogen selected from the group consisting of chlorine and bromine with ethylene glycol and an alkali metal cyanide in an aqueous solution of an alkali metal hydroxide.

5. The process of claim 4 wherein the alkali metal cyanide is potassium cyanide.

6. The process of claim 4 carried out at a temperature between about −20 and +10° C.

7. A process for making 2-chloroimino-1,3-dioxolane which comprises reacting at a temperature of up to about 50° C., chlorine, ethylene glycol, and potassium cyanide in an aqueous solution of sodium hydroxide.

No references cited.